April 17, 1962  G. O. EDGERLY ETAL  3,030,252
METHODS OF MAKING FLEXIBLE DIAPHRAGMS
FOR USE IN FLUID SPRINGS
Filed March 1, 1957  3 Sheets-Sheet 1
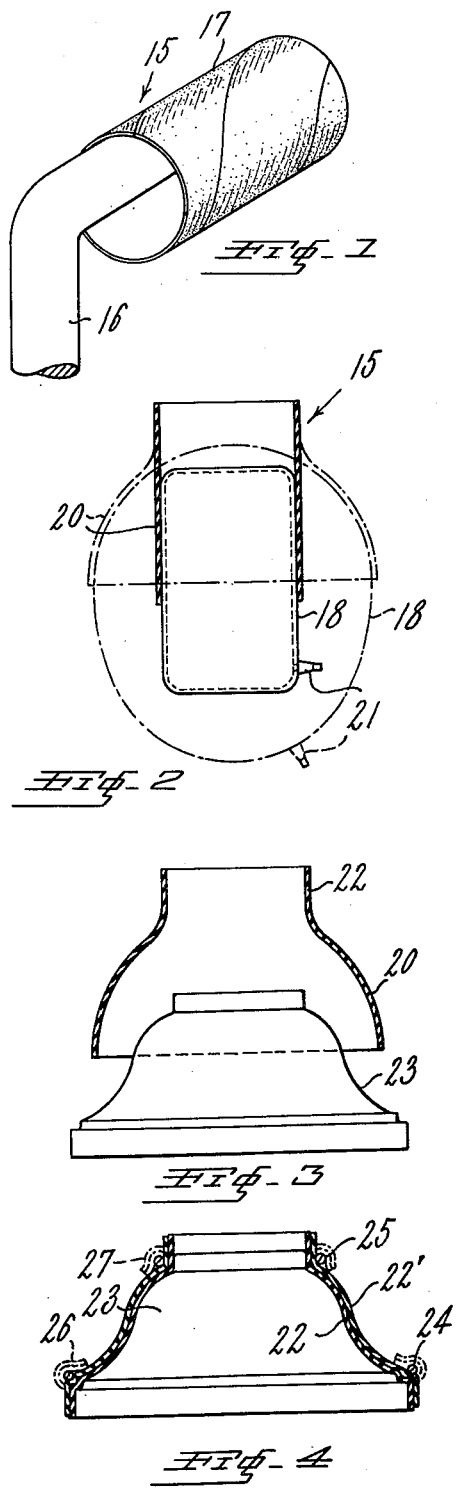
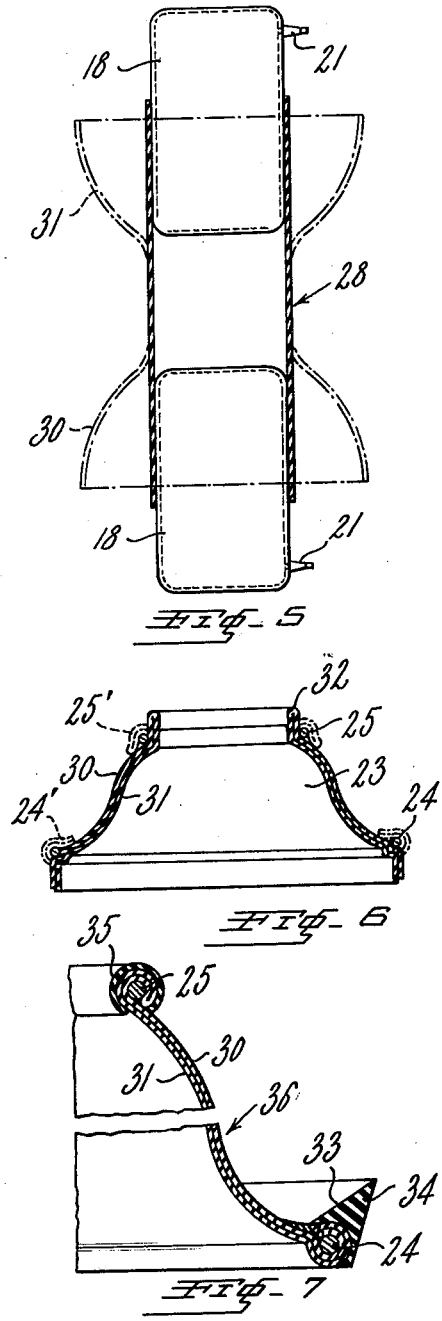
INVENTORS
GERALD O. EDGERLY
RUSSELL R. ECCLESTON
BY
Irwin M. Lewis
ATTORNEY

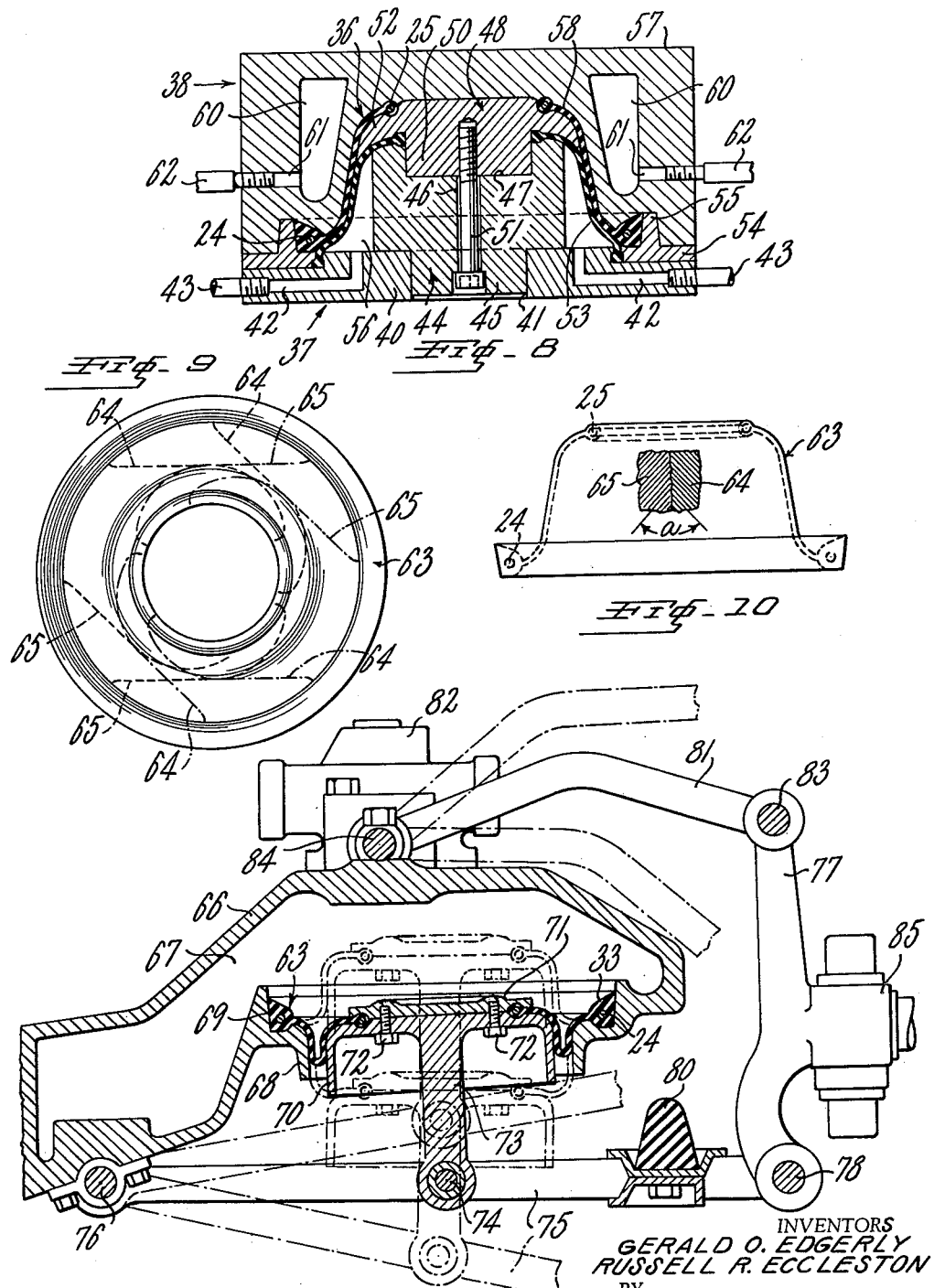

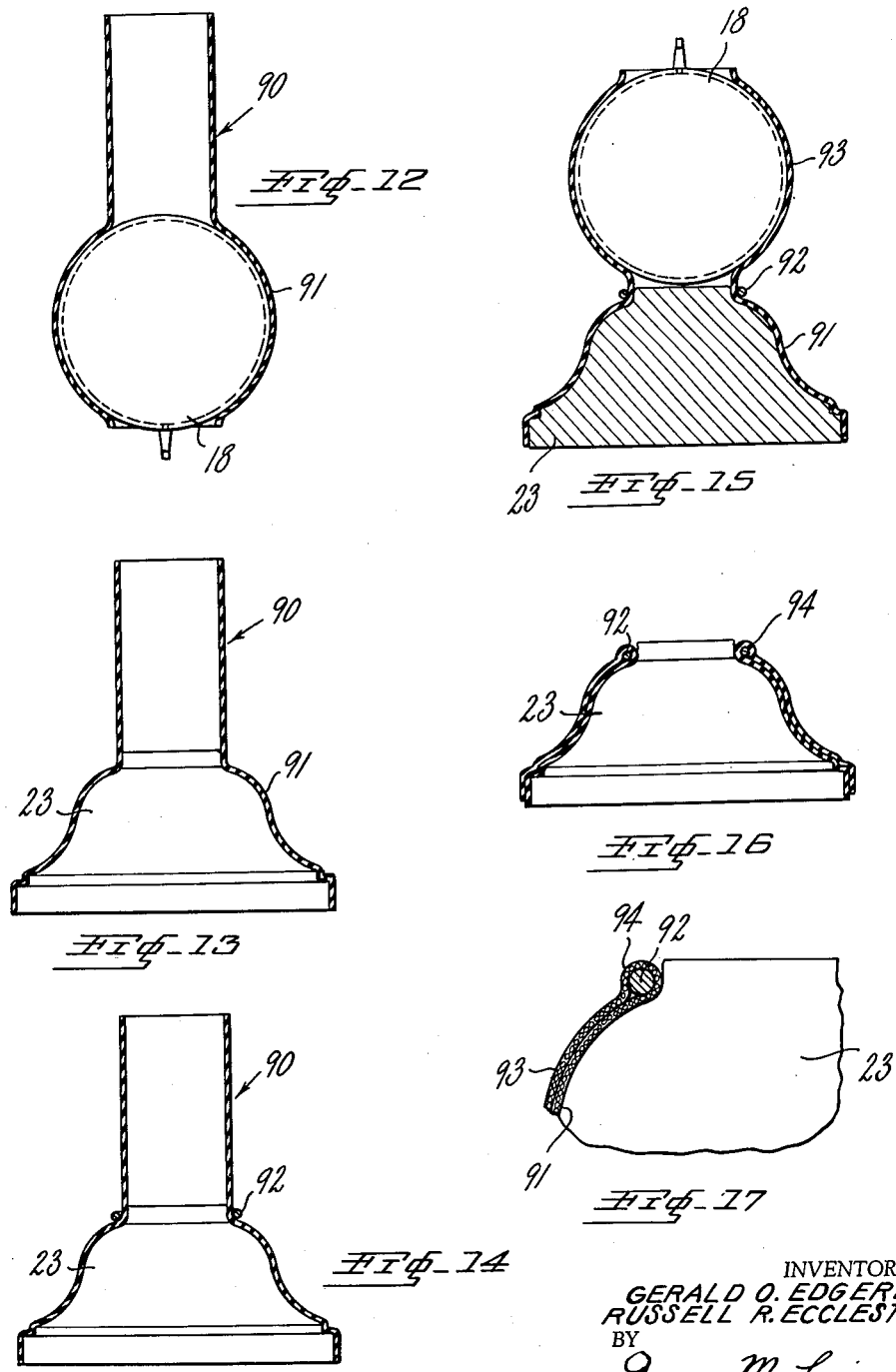

United States Patent Office 3,030,252
Patented Apr. 17, 1962

3,030,252
METHODS OF MAKING FLEXIBLE DIAPHRAGMS FOR USE IN FLUID SPRINGS
Gerald O. Edgerly, East Detroit, and Russell R. Eccleston, Detroit, Mich., assignors to United States Rubber Company, New York, N.Y., a corporation of New Jersey
Filed Mar. 1, 1957, Ser. No. 643,470
9 Claims. (Cl. 156—132)

This invention relates generally to the art of making diaphragms and, more specifically, to an improved method of making a flexible diaphragm for use in fluid springs and the like.

The diaphragm of this invention is useful in various environments and is especially useful as an element of a fluid spring of the controlled area type, including a cylinder, a piston and a flexible diaphragm which connects the piston to the cylinder. In this type of spring, the diaphragm is turned inside out in the course of a full stroke of the piston and, as a consequence, may be pinched between the piston and the cylinder and thereby damaged unless adequate restraint is provided to prevent excessive relative lateral movement between the piston and the cylinder.

The present invention constitutes an improvement over that disclosed in pending application of D. R. Elliott et al., Serial No. 495,534, filed March 21, 1955, and entitled "Fluid Spring," now Patent No. 2,901,242. As will be evident to persons skilled in the art from the ensuing detailed description and the accompanying drawings, the present invention embodies a number of novel features that contribute to its utility in practice. It should be borne in mind that this invention is concerned with a method for making diaphragms for use in fluid springs of the character disclosed in said D. R. Elliott et al. application.

It is the principal object of this invention to provide an improved method of making a flexible diaphragm of the character indicated.

A preferred and recommended diaphragm of this invention comprises a flexible, flared and generally cup-shaped tubular member having one end of substantially greater circumference than the other end. The tubular member is made from a single piece of single-ply cord fabric that is coated with a flexible fluid-impermeable composition, such as rubber, and that is formed and folded intermediate its ends in a manner to obtain two relatively superposed, substantially coextensive and coaxial tubular plies. The cords of the tubular member are substantially inextensible. Each end of the tubular member is provided with an annular bead portion which is secured to a corresponding bead wire. The end of the member of greater circumference is also provided with a continuous outwardly projecting lip of a resilient compressible composition, such as rubber.

In making the diaphragm, the strip of cord fabric is wound along a generally helical path about a mandrel to thereby obtain a flexible, single-ply, substantially right circular cylindrical tubular unit in which the individual cords of the fabric form an angle of between 15° and 75° with a plane that is normal to the axis of the unit. We have discovered that this angle, for best results, should be between 40° and 55°. Each end portion of the tubular unit is expanded and flared outwardly by subjecting it to uniform internal fluid pressure with the aid of a flexible resilient inflatable bag. One end of the flared unit is drawn along the remainder of the unit, that is, turned inside out, to obtain the two relatively superposed, substantially coextensive and coaxial plies. The individual cords of one of the plies extend across the individual cords of the other ply at an included angle of between 30° and 150°. This angle preferably is between 70° and 100°.

The two ply member is next shaped on a form and is equipped with the bead wires and the outwardly extending resilient lip at its end of greater circumference. The tubular member is then placed in apparatus, which will be described further along in this description, wherein it is molded and cured.

One of the important features of this invention is that of shaping the two plies, that is, expanding and flaring the tubular unit as outlined above, before the two plies are relatively superposed and attached to one another. By separately or independently shaping each ply, the desired and proper cord angle is maintained or retained. If the end portions of the tubular unit, or two separate tubular units, are superposed upon one another and then shaped, a change in cord angle results in the flared end, which change in some instances relocates the cord angle, particularly in cases of extreme flaring, so that the cord direction is substantially circumferential. In such cases, it may be impossible to flare the fabric material to the extent desired. Moreover, it is desirable and necessary to have maximum strength in the cords of the diaphragm in the flared part; whereas high strength is not as necessary near the small bead part. A low cord angle leads to low net strength, so our ideal is a high cord angle near the large bead or flared end of the diaphragm.

If the two plies are superposed on one another and then shaped to simultaneously flare one end of both plies, the change in cord angle will be the same as that which occurs when shaping tire casings. We have discovered that by separately shaping each ply of the diaphragm and then superposing one ply upon the other, the cord angle of each ply can be maintained, as desired. This phenomenon results from the fact that the cords in a single ply, upon being flared, spread out in a manner similar to the ribs of an umbrella, essentially maintaining a constant angle. If the two plies are superposed and then flared simultaneously, a pantograph action occurs between the cords of the plies, reducing the cord angle further and further as the flaring progresses.

The enumerated objects, together with advantages of this invention, will be readily comprehended from the following detailed description taken in conjunction with the annexed drawings which describe and illustrate preferred embodiments of the invention.

In the drawings:

FIG. 1 is an isometric view of a right circular cylindrical tubular unit formed on a mandrel from a strip of flexible, bias-cut cord fabric in accordance with this invention;

FIG. 2 is a central longitudinal cross sectional view of the tubular unit of FIG. 1 in association with an inflatable, expansible bag for expanding an end portion of this unit, the relative configuration of the unit and bag, after inflation of the bag, being represented by dot-dash lines;

FIG. 3 is an elevation view of a wooden building form for receiving and shaping the tubular unit of FIG. 2 after the later has been expanded at one end;

FIG. 4 is a view similar to FIG. 3 and illustrates an uncured diaphragm of this invention on the wooden building form at the time bead wires are applied to its ends;

FIGS. 5 and 6 correspond to FIGS. 2 and 4, respectively, and illustrate a modification of the invention;

FIG. 7 is an enlarged vertical cross sectional view of a portion of the uncured diaphragm of FIG. 6 after it is provided with rubber annuli at its ends;

FIG. 8 is a central vertical cross sectional view of apparatus for molding and curing a diaphragm of this invention, and illustrates the relative position of the parts of the apparatus and diaphragm during the molding and curing step;

FIG. 9 is a top plan view of the diaphragm of FIGS. 7 and 8, after curing, and shows in broken lines and in dot-dash lines a few of the cords of the fabric thereof to illustrate the directions they extend as incorporated in the diaphragm;

FIG. 10 is a view in elevation of the diaphragm of FIG. 9 with surface portions thereof broken away to better illustrate the cords of the fabric in the diaphragm;

FIG. 11 is a view partly in elevation and partly in vertical cross section, and illustrates the spring diaphragm of this invention incorporated in a wheel suspension of an automobile, the medial or normal position of certain parts being shown in full lines and the maximum upwardly and downwardly deflected positions of such parts being shown in dot-dash lines;

FIG. 12 is a longitudinal cross sectional view through a tubular unit corresponding to the tubular unit of FIG. 1 and shows the unit after it has been expanded and flared at one end;

FIG. 13 illustrates the tubular unit of FIG. 12 with its flared end disposed on the wooden building form;

FIG. 14 corresponds to FIG. 13 and shows a bead wire element encircling the tubular unit at the juncture of the flared and unflared portions thereof;

FIG. 15 corresponds to FIG. 14 and shows the tubular unit after it has been expanded and flared at its other end;

FIG. 16 corresponds to FIG. 15 and shows the upper flared portion of the tubular unit thereof folded down and over the lower flared portion with the bead wire element located in the bight of the fold; and FIG. 17 is an enlarged fragmentary view of the upper left hand portion of FIG. 16.

Referring now to the drawings wherein like reference numerals denote corresponding parts throughout the several views, we have illustrated in FIG. 1 a single-ply, substantially right circular cylindrical tubular unit 15 that is formed on a suitable tool, such as mandrel 16. Unit 15 is made from a strip of substantially inextensible weftless or weakened weft cord fabric of the type used in the manufacture of pneumatic tire casings. The strip may also be formed of a braided fabric. The cords of the fabric may be of nylon, cotton, rayon, steel, glass, or other relatively inextensible but flexible material. The cord fabric is coated, covered, or otherwise provided with flexible, resilient rubber, either natural or synthetic, or other suitable, flexible, resilient plastic material which will render the fabric fluid-impermeable. The strip of cord fabric is bias-cut and is disposed along a substantially helical path in making the tubular unit 15.

An inflatable, expandable bag 18 is inserted in an end portion 20 of tubular unit 15, as shown in FIG. 2. This bag has an inlet tube 21 that is adapted to be connected to a supply of compressed air, liquid under pressure, or other suitable fluid (not shown). The fluid admitted in the bag by way of inlet 21 inflates the bag and effects uniform expansion or flaring of portion 20, from the full line position shown in FIG. 2 to the dot-dash position. As stated earlier, the individual cords of the fabric of unit 15 form an angle of between 40° and 55° for best results. Due to the characteristics of the fabric, the individual cords substantially retain this angle relationship throughout their lengths prior and subsequent to expansion of the unit. After the unit 15 has been expanded, bag 18 is deflated and removed therefrom.

The tubular unit, after expansion, is identified by numeral 22.

The next step in the procedure is to place unit 22 on a wooden building form 23. A second tubular unit 22' is superposed on unit 22 as shown in FIG. 4. Unit 22' is the same as unit 22, except that the individual cords thereof intersect the cords of unit 22 to provide adequate restraint and thus prevent excessive lateral movement between the piston and the cylinder of the fluid spring during use. The tubular unit is shaped on building form 23 and is provided with substantially inextensible bead wires 24 and 25 at corresponding ends. The expressions "bead wire" and "bead wires" as used in this description and in the appended claims have reference to various types of annular wire units and include bead wire bundles comprising a plurality of turns of wire and bead wire elements comprising a single turn of a solid wire. As shown in FIG. 4, the extremities of the tubular plies 22 and 22' are turned outwardly to form turnups 26 and 27 which retain the bead wires in place.

Reference is next had to FIGS. 5 and 6, which correspond to FIGS. 2 and 4 and illustrate a modified form of construction. FIG. 5 shows a tubular unit 28 that is made in the same manner as unit 15, but is approximately twice as long. Each end portion of tubular unit 28 is expanded and flared outwardly by inflatable bags 18, the expanded or flared end portions being identified by numerals 30 and 31 in the drawings. Upon completion of expansion and removal of bags 18, expanded portion 31 is drawn along the remainder of the tubular unit, that is, turned inside out so as to obtain the two ply member shown in FIG. 6. It will be evident that the individual cords of each of these plies extend across the individual cords of the other ply in the same manner as described with reference to FIG. 4. The fold line, which is formed by turning part of the expanded unit 28 of FIG. 5 inside out, is identified by numeral 32 in FIG. 6.

As in the case of the earlier described construction, the two ply tubular unit of FIG. 6 is provided with bead wires 24 and 25, which are secured by corresponding turnups 24' and 25' that are made from the ends of the unit shown in FIG. 6.

An extruded strip of uncured rubber or similar composition is applied to the lower bead of the unit to form a tapered annular lip 33 having an outwardly and upwardly extending peripheral surface 34. A strip of uncured rubber or similar material 35 is applied to the upper bead and forms an annular cover therefor. The completed but uncured diaphragm is identified by numeral 36 in FIG. 7.

The diaphragm of FIG. 4 is similarly provided with rubber elements corresponding to annular strips 33 and 35 at the time of manufacture.

Diaphragm 36 is molded and cured by an arrangement of apparatus illustrated in FIG. 8. This apparatus consists of a lower unit 37 and an upper unit 38 which will now be described.

Lower unit 37 comprises a base plate 40 having a central opening 41 and a pair of L-shaped passages 42. A conduit 43 establishes communication between each passage 42 and a suitable source of compressed air or other fluid under pressure (not shown). A first block 44 has a stem 45 which registers with base plate opening 41. This block has a central vertical through opening 46 and a central top recess 47. A second block 48 has a stem 50 which registers with recess 47. This block is affixed to block 44 by a bolt 51 which extends through opening 46. Block 48 includes an annular flange 52 which has arcuate upper and lower surfaces, as illustrated. A tubular mold element 53 is clamped at its upper end between the upper surface of block 44 and the under surface of flange 52 and is retained in position due to the action of bolt 51. Mold element 53 is made of a suitable flexible material, such as cured rubber. A removable ring 54 has an upstanding circular flange 55. It will be observed that this ring cooperates with base plate 40 to retain the lower end of mold element 53 in position. Base plate 40, block 44 and mold element 53 define an annular space 56.

Upper mold unit 38 comprises a hollow block 57 having an inner surface 58 which is contoured to conform to the desired outer configuration of diaphragm 36. This block is provided with a plurality of fluid chambers 60 and passages 61, which establish communication between each chamber and the exterior of the block. A conduit 62 is adapted to transmit high temperature heating fluid from a source (not shown) into passages 61 and thence to chambers 60. The fluid so transmitted to chambers 60 supplies heat to the apparatus to effect proper curing of the diaphragm.

The cured diaphragm is represented by numeral 63 in FIGS. 9, 10 and 11.

Referring to FIGS. 9 and 10, the plies of the cord fabric of the diaphragm are so arranged that the cords of both plies extend from one end of the diaphragm to the other with the individual cords 64 of one ply extending across the individual cords 65 of the other ply at an included angle $a$ (FIG. 10). This angle, as was explained earlier herein, may be within the range of 30° to 150° and, for best results in use, is between 70° and 100°. Expressed in terms commonly used in the pneumatic tire field and related fields, the cords of the plies alternately extend in different directions at a cord angle of between 15° and 75° and, for best results, between 40° and 55°. The expression "cord angle" is intended to mean the angle between individual cords and a plane perpendicular to the surface of the plies and through a line tangential to and in the plane of a circumferential line of said surface.

Reference is next had to FIG. 11, which illustrates a fluid spring including a diaphragm of this invention incorporated in a wheel suspension of an automobile, the medial or normal position of certain parts of the suspension being shown in full lines and the maximum upwardly and downwardly deflected positions of such parts being shown in dot-dash lines. The illustrated wheel suspension comprises a hollow cross frame member 66 which defines a fluid chamber 67 that is adapted to be connected by a conduit (not shown) to a source of fluid supply under pressure (also not shown). Such fluid may be any suitable gas or vapor, as desired. Integral with and forming a part of the cross frame member 66 is a cylinder 68. The term "cylinder" is used herein in its broad mechanical or functional sense to define a member having an opening in which a piston may operate, and is not used in a strictly geometrical sense. Cylinder 68 is provided with an internal annular groove 69 that is so configured as to receive and retain the end of the diaphragm 63 having bead wire 24 and lip 33.

A piston 70 is affixed to the other end of the diaphragm by means of an imperforate clamping plate 71 and a series of bolts 72. The piston has an integral depending rod 73 which is pivoted at 74 to a lower control arm 75. Control arm 75 is pivotally connected at one end to cross frame member 66 by a pin 76 and at its other end to a knuckle support link 77 by a pin 78. The control arm carries one or more resilient rubber bumpers 80 which engage the under surface of the cross frame member 66 to thereby limit counterclockwise pivotal movement of the control arm about its pin 76.

An upper support arm 81 is pivotally connected at its ends to knuckle support link 77 and to a shock absorber 82 by corresponding pins 83 and 84. It will be observed that arms 75 and 81 carry knuckle support link 77 which, in turn, carries a steering knuckle 85 of the automobile.

The medial or normal relative position of piston 70, diaphragm 63, cylinder 68 and associated parts is shown in full lines in FIG. 11. The maximum upwardly and downwardly deflected relative positions of such parts are represented by corresponding dot-dash lines. It will be apparent from an examination of FIG. 11 that the diaphragm is turned inside out in the course of movement from its maximum downwardly deflected position to its maximum upwardly deflected position. The operation of the suspension shown in this view is believed to be evident from the drawing without further description. The structure does operate in the same manner as that disclosed in said pending D. R. Elliott et al. application to which reference may be had for further details, if desired.

FIGS. 12 through 17 illustrate successive stages in procedure in making a modified form of diaphragm in which a bead wire is located in the bight of the fold of the superposed plies of the diaphragm. A tubular unit 90, which may be the same as or similar to tubular unit 28, is expanded at one end by inflatable bag 18 to obtain a flared end portion 91. Upon deflation and removal of bag 18, flared end portion 91 is placed and shaped on wooden building form 23, as shown in FIG. 13. A bead wire 92, corresponding to bead wire 25, is then slipped down over the unflared portion of the tubular unit and is properly positioned with respect to flared portion 91 (FIG. 14).

The formerly unflared portion of the tubular unit is now expanded and flared by bag 18, as indicated by numeral 93 in FIG. 15, while previously flared portion 91 is ont he building form and the bead wire is in position. Flared portion 93 is then folded down and over flared portion 91, whereby the bead wire is enclosed and located in the bight of fold 94, as illustrated in FIGS. 16 and 17. The thus relatively superposed portions 91 and 93, which constitute the plies of the diaphragm, may be stitched together while on the building form.

A bead wire 24 and an annular lip 33 (FIG. 7) are then applied and the diaphragm is cured in the manner described earlier herein.

The principal advantage of the construction shown in FIGS. 16 and 17 is that the bead wire 92 is locked in place between the two plies.

From the foregoing, it is believed that the objects and advantages of the herein described method of making diaphragms will be apparent to those skilled in the art, without further description. It is to be understood, however, that the invention may be embodied otherwise than as herein shown and described and that various changes may be made without departing from the spirit or sacrificing any of the advantages of the invention.

We claim:

1. In a method of making a generally tubular, flexible diaphragm having a larger end and a smaller end by superposing and adhering at least two plies of bias-cut cord fabric formed of cord elements coated with a flexible fluid-impermeabble composition, each of the cord elements of each ply extending from one end of said diaphragm to the other with the cord elements of one ply crossing those of the other ply, the improvement comprising the steps of helically winding said bias-cut cord fabric plies to form at least two separate and single-ply cylindrical units, subjecting the interior of one end portion of each ply to fluid pressure to thereby expand and flare the same outwardly, and thereafter superposing and adhering the plies to obtain a generally tubular flexible diaphragm having a larger end and a smaller end and having at least two superposed and coextensive plies of said coated cord fabric.

2. In a method of making a generally tubular, flexible, fluid-spring diaphragm having a larger end and a smaller end by superposing and adhering at least two plies of cord fabric formed of relatively inextensible cord elements coated with a flexible fluid-impermeable composition, each of the cord elements of each ply extending from one end of said diaphragm to the other with the cord elements of one ply crossing those of the other ply at an included angle of between 30° and 150° and at a cord angle of between 15° and 75°, the improvement comprising the steps of forming at least two separate and single-ply cylindrical units from said plies with the cord elements of said plies disposed at a substantially constant cord angle of between 15° and 75°, expanding one end portion of each ply to thereby flare the same outwardly, and thereafter superposing and adhering the plies to obtain a generally tubular flexible diaphragm having a larger end and a smaller end and having at least two superposed and coextensive plies of said coated cord fabric, with said included angle and said cord angle being maintained substantially constant throughout the entire diaphragm.

3. In a method of making a generally tubular, flexible, fluid-spring diaphragm having a larger end and a smaller end by superposing and adhering at least two plies of bias-cut cord fabric formed of relatively inextensible cord elements coated with a flexible fluid-impermeable composition, each of the cord elements of each ply extending from one end of said diaphragm to the other with the cord elements of one ply crossing those of the other ply at an included angle of between 70° and 100° and at a cord angle of between 40° and 55°, the improvement comprising the steps of helically winding said bias-cut cord fabric plies to form at least two separate and single-ply cylindrical units with the cord elements of said plies disposed at a substantially constant cord angle of between 40° and 55°, subjecting the interior of one end portion of each ply to fluid pressure to thereby expand and flare the same outwardly, and thereafter superposing and adhering the plies to obtain a generally tubular flexible diaphragm having a larger end and a smaller end and having at least two superposed and coextensive plies of said coated cord fabric, with said included angle and said cord angle being maintained substantially constant throughout the entire diaphragm.

4. In a method of making a generally tubular, fluid-spring diaphragm having a larger end and a smaller end by superposing and adhering at least two plies of bias-cut cord fabric formed of relatively inextensible cord elements coated with a flexible fluid-impermeable curable composition, each of the cord elements of each ply extending from one end of said diaphragm to the other with the cord elements of one ply crossing those of the other ply at an included angle of between 30° and 150° and at a cord angle of between 15° and 75°, the improvement comprising the steps of helically winding said bias-cut cord fabric plies to form at least two separate and single-ply cylindrical units with the cord elements of said plies disposed at a substantially constant cord angle of between 15° and 75°, subjecting the interior of one end portion of each ply to fluid pressure to thereby expand and flare the same outwardly, superposing and adhering the plies to obtain a generally tubular flexible diaphragm having a larger end and a smaller end and having at least two superposed and coextensive plies of said coated cord fabric, with said included angle and said cord angle being maintained substantially constant throughout the entire diaphragm, securing a substantially incompressible bead wire to each end of the diaphragm, forming a continuous outwardly projecting lip of a resilient compressible curable composition on the outer periphery of the larger end of the diaphragm, and molding and curing the diaphragm.

5. In a method of making a generally tubular, flexible, fluid-spring diaphragm having a larger end and a smaller end by superposing and adhering two plies of cord fabric formed of relatively inextensible cord elements coated with a flexible fluid-impermeable composition, each of the cord elements of each ply extending from one end of said diaphragm to the other with the cord elements of one ply crossing those of the other ply at an included angle of between 30° and 150° and at a cord angle of between 15° and 75°, the improvement comprising the steps of forming two single-ply cylindrical units from said coated cord fabric with the cord elements of said fabric disposed at a substantially constant cord angle of between 15° and 75°, expanding one end portion of each cylindrical unit to thereby flare the same outwardly, and thereafter superposing and adhering the flared units to obtain a generally tubular flexible diaphragm having a larger end and a smaller end and having two superposed and coextensive plies of said coated cord fabric, with said included angle and said cord angle being maintained substantially constant throughout the entire diaphragm.

6. In a method of making a generally tubular, flexible diaphragm having a larger end and a smaller end by superposing and adhering two plies of fabric coated with a flexible fluid-impermeable composition, the improvement comprising the steps of forming one single-ply cylindrical unit from said coated fabric, expanding both end portions of the cylindrical unit to thereby flare the same outwardly, and thereafter superposing and adhering the flared end portions to obtain a generally tubular flexible diaphragm having a larger end and a smaller end and having two superposed and coextensive plies of said coated fabric.

7. In a method of making a generally tubular, flexible, fluid-spring diaphragm having a larger end and a smaller end by superposing and adhering two plies of cord fabric formed of relatively inextensible cord elements coated with a flexible fluid-impermeable composition, each of the cord elements of each ply extending from one end of said diaphragm to the other with the cord elements of one ply crossing those of the other ply at an included angle of between 30° and 150° and at a cord angle of between 15° and 75°, the improvement comprising the steps of forming one single-ply cylindrical unit from a single strip of said cord fabric with the cord elements of said fabric disposed at a substantially constant cord angle of between 15° and 75°, expanding both end portions of the cylindrical unit to thereby flare the same outwardly, drawing one flared end of the unit along the remainder thereof to a position over the other flared end of said unit thereby forming a continuous fold line at the center of said unit and obtaining a generally tubular flexible diaphragm having a larger end and a smaller end at said fold line and having two superposed and coextensive plies of said coated cord fabric, with said included angle and said cord angle being maintained substantially constant throughout the entire diaphragm.

8. In a method of making a generally tubular, flexible, fluid-spring diaphragm having a larger end and a smaller end by superposing and adhering two plies of bias-cut cord fabric formed of relatively inextensible cord elements coated with a flexible fluid-impermeable composition, each of the cord elements of each ply extending from one end of said diaphragm to the other with the cord elements of one ply crossing those of the other ply at an included angle of between 70° and 100° and at a cord angle of between 40° and 55°, the improvement comprising the steps of helically winding a single strip of said bias-cut cord fabric to form one single-ply cylindrical unit with the cord elements of said fabric disposed at a substantially constant cord angle of between 40° and 55°, subjecting the interior of both end portions of the cylindrical unit to fluid pressure to thereby expand and flare the same outwardly, drawing one flared end of the unit along the remainder thereof to a position over the other flared end of said unit thereby forming a continuous fold line at the center of said unit and obtaining a generally tubular flexible diaphragm having a larger end and a smaller end at said fold line and having two superposed and coextensive plies of said coated cord fabric, with said included angle and said cord angle being maintained substantially constant throughout the entire diaphragm.

9. In a method of making a generally tubular, flexible, fluid-spring diaphragm having a larger end and a smaller end by superposing and adhering two plies of cord fabric formed of relatively inextensible cord elements coated with a flexible fluid-impermeable composition, each of the cord elements of each ply extending from one end of said diaphragm to the other with the cord elements of one ply crossing those of the other ply at an included angle of between 30° and 150° and at a cord angle of between 15° and 75°, the improvement comprising the steps of forming one single-ply cylindrical unit from a single strip of said cord fabric with the cord elements of said fabric disposed at a substantially constant cord angle of between 15° and 75°, expanding a first end portion of the cylindrical unit to thereby flare the same outwardly, placing a substantially incompressible bead wire around the center of said unit in the region of the juncture of the flared portion with the remainder thereof, expanding a second end portion of the cylindrical unit to thereby flare the same outwardly, drawing one flared end of the unit along the remainder thereof to a position over the other flared end of said unit thereby forming a continuous fold line at the center of said unit and obtaining a generally tubular flexible diaphragm having a larger end and a smaller end at said fold line and having two superposed and coextensive plies of said coated cord fabric, with said included angle and said cord angle being maintained substantially constant throughout the entire diaphragm and with said bead wire positioned between the plies in the region of the fold line.

References Cited in the file of this patent

UNITED STATES PATENTS

| Number | Name | Date |
|---|---|---|
| 1,610,173 | Slade | Dec. 7, 1926 |
| 2,037,666 | Pennington | Apr. 14, 1936 |
| 2,178,953 | Chilton | Nov. 7, 1939 |
| 2,221,470 | Brown | Nov. 12, 1940 |
| 2,275,712 | Zand | Mar. 10, 1942 |
| 2,324,880 | Rogers et al. | July 20, 1943 |
| 2,444,394 | Arnold | June 29, 1948 |
| 2,578,730 | Nicholson et al. | Dec. 18, 1951 |
| 2,749,266 | Eldred | June 5, 1956 |
| 2,766,161 | Hagopian et al. | Oct. 9, 1956 |
| 2,768,106 | Sartakoff | Oct. 23, 1956 |
| 2,785,442 | Boggs | Mar. 19, 1957 |
| 2,839,440 | Pfeiffer et al. | June 17, 1958 |
| 2,874,458 | Smith | Feb. 24, 1959 |
| 2,901,242 | Elliot et al. | Aug. 25, 1959 |
| 2,971,560 | Hollis et al. | Feb. 14, 1961 |